United States Patent

Büch et al.

Patent Number: 5,349,057
Date of Patent: Sep. 20, 1994

[54] WATER SOLUBLE AZO DYES CONTAINING A CYANOAMINO-TRIAZINYL-AMINO GROUP AND A FIBER-REACTIVE OF THE SULFONE SERIES

[75] Inventors: Holger M. Büch, Hofheim am Taunus; Hartmut Springer, Königstein/Taunus, both of Fed. Rep. of Germany

[73] Assignee: Hoechst Aktiengesellschaft, Frankfurt am Main, Fed. Rep. of Germany

[21] Appl. No.: 772,375

[22] PCT Filed: May 4, 1990

[86] PCT No.: PCT/EP90/00716

§ 371 Date: Jan. 10, 1992

§ 102(e) Date: Jan. 10, 1992

[87] PCT Pub. No.: WO90/13603

PCT Pub. Date: Nov. 15, 1990

[30] Foreign Application Priority Data

May 10, 1989 [DE]  Fed. Rep. of Germany ....... 3915305
Oct. 17, 1989 [DE]  Fed. Rep. of Germany ....... 3934514

[51] Int. Cl.$^5$ .......................... C09B 62/08; D06P 1/38
[52] U.S. Cl. ...................... 534/637; 534/622; 534/624; 534/625; 534/628; 534/629; 534/634; 534/635; 534/636; 534/638; 534/641; 534/642
[58] Field of Search ............. 534/622, 624, 625, 628, 534/629, 634, 635, 636, 637, 638, 641, 642

[56] References Cited

U.S. PATENT DOCUMENTS 3,758,470  9/1973  Ackermann et al. ............... 534/622
4,649,193  3/1987  Meininger et al. ................ 534/622
5,200,512  4/1993  Reiner ............................... 534/632

FOREIGN PATENT DOCUMENTS 0040806  12/1981  European Pat. Off. .
2066070  8/1971  France .

Primary Examiner—Robert W. Ramsuer
Assistant Examiner—Fiona T. Powers

[57] ABSTRACT

Water-soluble azo dyes and their heavy metal complex derivatives, such as copper, cobalt and chromium complex azo dyes are described, which have the general formula (1) shown below, have fiber-reactive properties and dye natural and synthetic hydroxyl- and/or carboxamido-containing materials, in particular fiber materials, such as wool and in particular cellulose fiber materials, by the dyeing and printing processes customary for fiber-reactive dyes, in hues which have high color strength and good fastness properties.

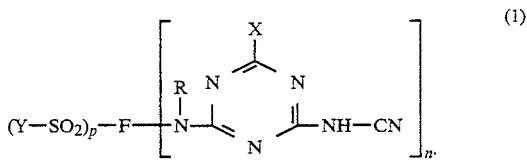

16 Claims, No Drawings

WATER SOLUBLE AZO DYES CONTAINING A CYANOAMINO-TRIAZINYL-AMINO GROUP AND A FIBER-REACTIVE OF THE SULFONE SERIES

The invention is in the technical field of fiber-reactive dyes.

Azo dyes containing a 2-chloro-4-cyanamido-s-triazin-6-ylamino radical are known from U.S. Pat. No. 3,758,470. However, these known dyes have certain shortcomings in practical application; thus, they are in particular not suitable for dyeing by the cold pad-batch method and the various exhaust methods at lower dyeing temperatures (40° to 60° C.).

Furthermore, dyes are known from European Patent Application Publication No. 0,040,806A, which have a fiber-reactive radical of the vinyl sulfone series at a separate point of the chromophore, and which have as a further fiber-reactive radical a fluoro-s-triazinylamino group, which contains as further substituents, inter alia, an optionally substituted amino group. In Table Example 23 a monoazo dye is named which is said to contain a 2-cyanamido-4-fluoro-s-triazin-6-ylamino group, whose synthesis is however difficult.

By means of the present invention, new water-soluble azo dyes have now been found which are improved in this respect and have the general formula (1)

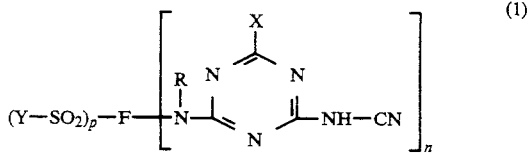

(1)

in this formula, the symbols have the following meanings:

F is the radical of a monoazo, disazo or polyazo dye or of a heavy metal complex azo dye, such as a 1: copper complex, 1:2 chromium complex or 1:2 cobalt complex azo dye;

R is hydrogen or alkyl of 1 to 4 carbon atoms, such as methyl or ethyl, which can be substituted by halogen, such as chlorine and bromine, hydroxyl, cyano, alkoxy of 1 to 4 carbon atoms, such as methoxy and ethoxy, alkoxycarbonyl of 2 to 5 carbon atoms, carboxyl, sulfamoyl, sulfo or sulfato, and is preferably methyl or ethyl and in particular hydrogen;

X is chlorine, bromine, sulfo, alkylsulfonyl of 1 to 4 carbon atoms or phenylsulfonyl, preferably chlorine;

Y is vinyl, β-sulfatoethyl, β-thiosulfatoethyl, β-phosphatoethyl, β-alkanoyloxyethyl of 2 to 5 carbon atoms in the alkanoyl radical, such as β-acetyloxyethyl, β-benzoyloxyethyl, β-(sulfobenzoyloxy)ethyl, β-(p-toluenesulfonyloxy)ethyl or β-halogenoethyl, such as β-bromoethyl or β-chloroethyl, preferably vinyl and in particular β-sulfatoethyl;

p is the number 1 or 2;

n is the number 1 or 2, preferably 1.

The groups —SO₂—Y can be bound to an aromatic carbon atom of F via an alkylene radical of 1 to 4 carbon atoms, such as a methylene group, or via an alkyl-amino group of 1 to 4 carbon atoms, such as a methylamino or ethylamino group.

F is preferably the radical of a monoazo or disazo dye or the radical of an o,o'-1:1 copper complex monoazo or disazo dye. The radical F can contain the substituents customary for organic dyes, including a fiber-reactive group of a type other than that shown in formula (1), bound to its basic structure. Examples of these substituents are: alkyl groups of 1 to 4 carbon atoms, such as methyl, ethyl, propyl, isopropyl or butyl, of these, preferably ethyl and in particular methyl; alkoxy groups of 1 to 4 carbon atoms, such as methoxy, ethoxy, propoxy, isopropoxy and butoxy, of these, preferably ethoxy and in particular methoxy; acylamino groups of 2 to 8 carbon atoms, such as acetylamino, propionylamino or benzoylamino groups; primary and monosubstituted or disubstituted amino groups, such as, for example, those substituted by alkyl groups of 1 to 4 carbon atoms and/or phenyl groups, such as monoalkylamino and dialkylamino groups of 1 to 4 carbon atoms in the alkyl radical, phenylamino or N-($C_1$-$C_4$-alkyl)-N-phenylamino groups, in which the alkyl radicals can be further substituted, for example by phenyl, sulfophenyl, hydroxyl, sulfato, sulfo and carboxyl, and the phenyl groups can be further substituted, such as by chlorine, sulfo, carboxyl, methyl and/or methoxy, for example methylamino, ethylamino, propylamino, isopropylamino, butylamino, N,N-di(β-hydroxyethyl)amino, N,N-di(β-sulfatoethyl)amino, sulfobenzylamino, N,N-di(sulfobenzyl)amino and diethylamino groups and phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups, which can be monosubstituted or disubstituted by alkyl of 1 to 4 carbon atoms, in which the alkyl radicals in turn can be substituted, such as, for example, by hydroxyl, sulfato, sulfo, carboxyl, phenyl and sulfophenyl, such as, for example N-methylcarbamoyl and N-ethylcarbamoyl; sulfamoyl groups, which can be monosubstituted or disubstituted by alkyl groups of 1 to 4 carbon atoms, and N-phenyl-N-alkylsulfamoyl groups having an alkyl group of 1 to 4 carbon atoms, in which these alkyl groups in turn can be substituted by hydroxyl, sulfato, sulfo, carboxyl, phenyl and sulfophenyl, such as, for example, N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl)sulfamoyl; N-phenylsulfamoyl, ureido, hydroxyl, carboxyl, sulfomethyl and sulfo groups.

The dye radical F is preferably substituted by one or more, such as 2 to 4, sulfo groups and furthermore can preferably contain substituents selected from the group comprising methyl, ethyl, methoxy, ethoxy, acetylamino, benzoylamino, amino, chlorine, bromine, ureido, hydroxyl, carboxyl and sulfomethyl.

The dye radical F can also have other fiber-reactive groups known from the literature, which do not correspond to the formula —SO₂—Y where Y has the above-mentioned meaning and not to the general formula (3) mentioned later. These known fiber-reactive groups are, for example, a low-molecular-weight alkanoylamino radical which is unsubstituted or substituted by a detachable atom or a detachable group, a low-molecular-weight alkenoylamino or alkenesulfonylamino radical, which is unsubstituted or substituted by a detachable atom or a detachable group, or a carbocyclic, carbocyclicheterocyclic or heterocyclic radical, which is unsubstituted or substituted by a detachable atom or a detachable group, which are bound to the radical A via a carbonylamino or sulfonylamino group and in which the heterocyclic components of these radicals are four-, five- or six-membered, or a triazinyl or pyrimidinyl radical, which is bound to the radical A via an amino, methylamino or ethylamino group and is unsubstituted or substituted by a detachable atom or a detachable group. Examples of these radicals are a halogen-substituted six-membered heterocyclic radical, bound via an amino, methylamino or ethylamino group, such as, for example, a halogenotriazinyl or halogenopyrimidinyl radical, or are aliphatic acylamino radicals, such as a halogenoacetylamino or halogenopropionylamino radical.

Examples of formula radicals R are: hydrogen, methyl, ethyl, propyl, isopropyl, butyl, isobutyl, sec.-butyl, tert.-butyl, carboxymethyl, β-carboxyethyl, β-carboxypropyt, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, amidosulfonylmethyl and β-sulfatoethyl.

Of the 1:1 copper complex azo dyes according to the invention, those of the benzene and naphthalene series are preferred.

Monoazo and disazo dyes according to the invention of the general formula (1) are, for example, those of the general formula (2a) or (2b)

$$(Y-SO_2)_p-D-N=N-(E-N=N)_v-K-Z \quad (2a)$$

$$Z-D-N=N-(E-N=N)_v-K-(SO_2-Y)_p \quad (2b)$$

or of a heavy metal complex derived therefrom, such as a 1:1 copper complex, in which Y and p have the abovementioned meanings, D is the radical of a diazo component of the benzene or naphthalene series, E is the radical of a middle component of the benzene or naphthalene series and K is the radical of a coupling component of the benzene, naphthalene, pyrazolone, 6-hydroxy-2-pyridone or acetoacetarylamide series, in which D, E and K can contain substituents customary for azo dyes, in particular sulfo, carboxyl, hydroxyl, amino, methyl, ethyl, methoxy, ethoxy groups, substituted or unsubstituted alkanoylamino groups of 2 to 4 carbon atoms in the alkanoyl radical, substituted or unsubstituted benzoylamino groups and halogen atoms, such as bromine and chlorine atoms, and/or a trifluoromethyl group, D, E and K together having at least two sulfo groups, preferably three or four sulfo groups, v is the number zero or 1 and Z is a group of the formula (3)

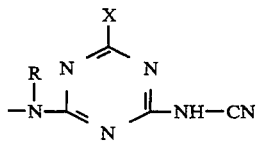

where R and X have the abovementioned meanings.

Further preferred disazo dyes are those of the general formula (2c)

$$(Y-SO_2)_p-D-N=N-K^o-N=N-D-Z \quad (2c)$$

in which Y, p and Z have the abovementioned meanings and both D, independently of one another, are the radical of a diazo component of the benzene or naphthalene series and $K^o$ is the radical of a bivalent coupling component of the naphthalene series, it being possible for D and $K^o$ to carry the substituents customary for azo dyes, such as sulfo, carboxyl, hydroxyl, amino, methyl, ethyl, trifluoromethyl, methoxy and ethoxy groups, substituted or unsubstituted alkanoylamino groups of 2 to 4 carbon atoms in the alkanoyl radical, substituted or unsubstituted benzoylamino groups and halogen atoms, such as chlorine and bromine atoms, both D and $K^o$ together containing at least two sulfo groups, preferably three or four sulfo groups.

Of the disazo compounds according to the invention of the general formula (2c), especially those may be mentioned in particular which have the general formula (2d) and (2e)

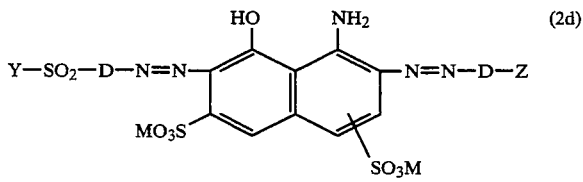

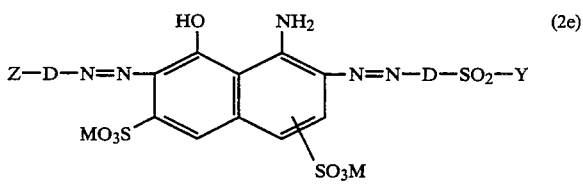

in which

M is hydrogen or an alkali metal, such as sodium, potassium or lithium, and

D, Y and Z have the abovementioned meanings.

Examples of preferred metal complex azo dyes according to the invention are those which have the general formula (2f)

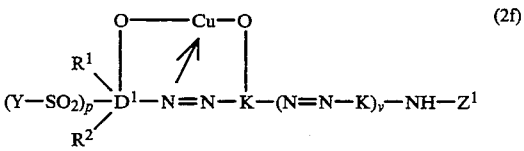

in which $Z^1$ is a radical of the general formula (3a)

preferably the radical of an aminosubstituted naphthol, which can be substituted by 1 or 2 sulfo groups.

Of the dyes according to the invention, those can furthermore be mentioned as being preferred which have the general formulae (2A) to (2G):

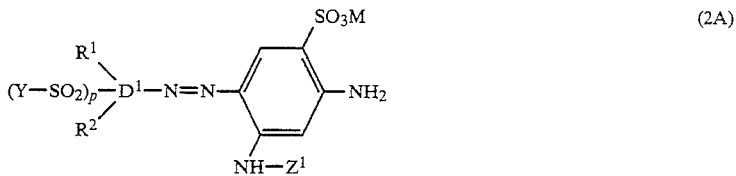

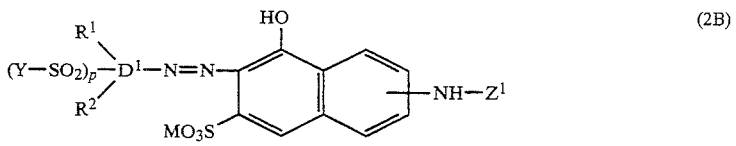

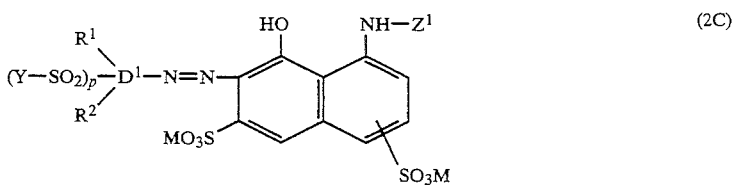

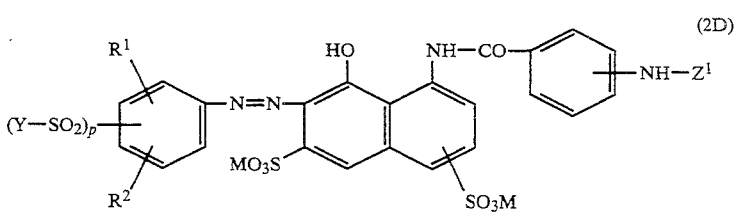

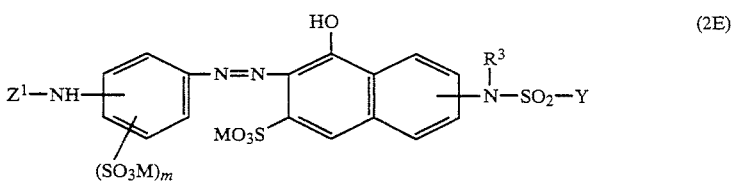

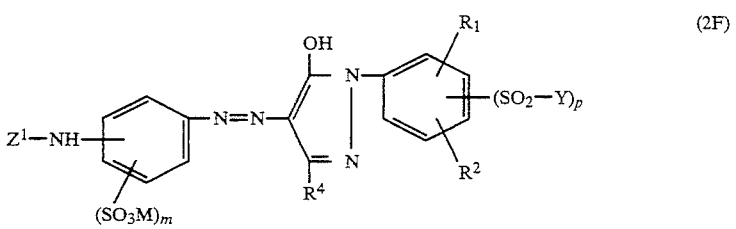

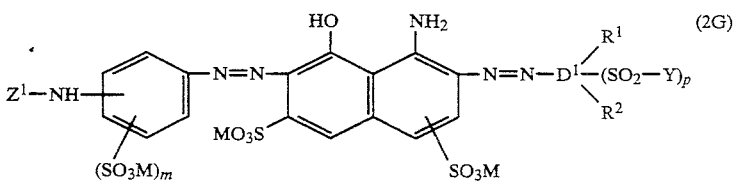

in which the symbols have the following meanings:

M, Y, $Z^1$ and p have one of the abovementioned, in particular preferred, meanings;

$R^1$ is hydrogen, alkyl of 1 to 4 carbon atoms, such as ethyl and in particular methyl, alkoxy of 1 to 4 carbon atoms, such as ethoxy and in particular methoxy, halogen, such as chlorine and bromine, trifluoromethyl, carboxyl or sulfo;

(3a)

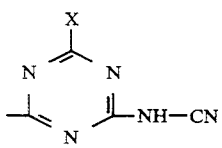

where X has the abovementioned, particularly preferred, meaning and $D^1$ has the meaning given below and Y, p, $R^1$, $R^2$, v and K have the abovementioned, particularly preferred, meanings, in which both K as the radicals of a coupling component, independently o one another, are particularly R² is hydrogen, alkyl of 1 to 4 carbon atoms, such as ethyl and in particular methyl, alkoxy of 1 to 4 carbon atoms, such as ethoxy and in particular methoxy, halogen, such as chlorine and bromine, or sulfo;

D¹ is a benzene ring, or a naphthalene ring to which the azo group is preferably bound in the β-position, and in the case where D is a naphthalene ring, R¹ and R² are each preferably, independently of one another, hydrogen or sulfo;

m is the number zero, 1 or 2 (this group being hydrogen in the case where m is zero);

R3 is alkyl of 1 to 4 carbon atoms, such as ethyl or methyl;

R⁴ is methyl, carboxyl or carbalkoxy of 2 to 5 carbon atoms, such as carbomethoxy;

the one —SO₃M group bound in formula (2G) to the aminonaphthol radical is preferably in the meta position relative to the amino group.

The present invention furthermore relates to a process for the preparation of the dyes according to the invention of the general formula (1). They can be prepared in a manner known per se analogously to known synthetic routes which are specific for the particular class of dyes by reacting precursors which are representative of the particular dye, and at least one of which contains a 20 group of the general formula (3) and at least one of which contains a group of the general formula —SO₂—Y, with one another or by starting with an amino-containing starting compound of the general formula (14)

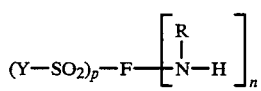  (14)

in which Y, p, F, R and n have the abovementioned meanings and reacting it with a halogeno-s-triazine of the general formula (15)

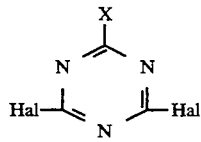  (15)

in which Hal is a chlorine or bromine atom and X has the abovementioned meaning and with cyanamide or an alkali metal salt thereof in stoichiometric amounts in any desired order with one another and, if desired, subsequently carrying out further necessary conversion reactions known to one skilled in the art. These starting compounds, including the compounds of the general formula (14), have been described in the literature in large numbers. The reaction can be carried out analogously to the procedures known and customary in the literature of the reaction of a halogenotriazine with an amino compound and/or with cyanamide (see, for example, U.S. Pat. No. 3,758,470 mentioned at the beginning).

The dyes according to the invention can in particular be prepared according to the invention by reacting a compound of the general formula (16)

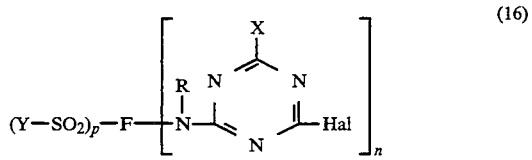  (16)

in which Y has the abovementioned meaning, but is preferably a β-hydroxyethyl group, and in which p, F, R, X, Hal and n have the abovementioned meanings, with cyanamide or an alkali metal salt thereof, or by reacting an amino compound of the general formula (14) with a compound of the general formula (17)

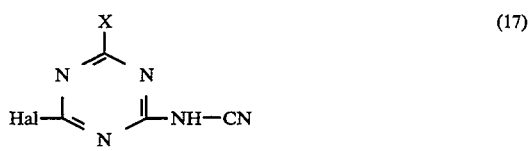  (17)

in which X and Hal have the abovementioned meanings.

The azo compounds according to the invention can also be prepared in accordance with the customary procedures of diazotization and coupling by starting with the diazo and coupling components suitable for the particular dye, one component of which contains one or two groups of the general formula —SO₂—Y where Y has the abovementioned meaning and the other a radical of the general formula (3). Diazo components and coupling components containing one or two groups of the formula —SO₂—Y or one group of the general formula (3) and their synthesis have also been described in the literature.

The reaction of the starting compound of the general formula (16) with cyanamide or an alkali metal salt thereof is carried out in aqueous medium, preferably in solution, at a temperature between 20° and 95° C., preferably between 40° and 70° C., and at a pH between 7 and 12, preferably between 8 and 10.

The reaction of the starting compound of the general formula (14) with the compound of the general formula (17) is carried out in aqueous or aqueous-organic medium in suspension or solution at a temperature between 0° and 60° C., preferably between 15° and 30° C., and at a pH between 2 and 7, preferably between 3 and 4.5. The organic portion of the reaction medium is, for example, acetone, dimethylformamide or N-methylpyrrolidone.

Under certain reaction conditions, a halogenotriazine radical can induce hydrolysis; that is why in the case of an intermediate or precursor which contains a protective group, such as, for example, an acetylamino group, the acetyl group has to be cleaved off by hydrolysis before the reaction with the halogenotriazine can take place. The order in which the various abovementioned reactions between the halogenotriazine and the amino starting compounds are advantageously carried out first, is different from case to case and depends in particular on the solubility of the amino compounds involved and the basicity of the amino groups which are to be reacted with the halogenotriazine radical.

The synthesis according to the invention by means of diazotization and coupling reaction of the corresponding diazo and coupling starting component is carried out by the usual procedure of diazotization and coupling reactions, for example the diazotization, as a rule, at a temperature between −5° C. and +15° C. and a pH below 2 by means of a strong acid and alkali metal nitrite in, preferably, aqueous medium and the coupling reaction, as a rule, at a pH between 1.5 and 4.5 in the case of an amino-containing coupling component and at a pH between 3 and 7.5 in the case of a hydroxyl-containing coupling component and at a temperature between 0° and 25° C., also preferably in aqueous medium.

The synthesis according to the invention of the heavy metal complex azo dyes according to the invention can, for example, also be started with those metal-free azo dyes which have the general formula (1), but in which the diazo and coupling components in the ortho position relative to the azo group each contain a hydroxyl group or carboxyl group capable of forming a complex. This o,o'-dihydroxy- or o-carboxy-o'-hydroxyazo starting compound of the general formula (1) is then reacted in a customary and known manner with an agent donating a heavy metal ion, such as, for example, copper chloride, copper sulfate, chromium chloride, chromium sulfate and cobalt chloride to give the heavy metal complex azo dye according to the invention.

For example, the copper complex azo compounds according to the invention of the general formula (2f) can be prepared in such a manner that a compound of the general formula (18)

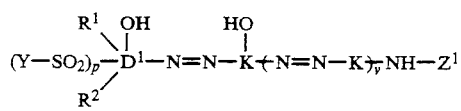

in which the individual formula members have one of the abovementioned meanings is reacted with an agent donating a copper ion, such as, for example, copper chloride or copper sulfate, in aqueous medium at a temperature between 0° and 30° C.

As has already been indicated above the dyes according to the invention can also be prepared according to the invention by starting with a compound of the general formula (1) and the meanings mentioned, except that the group(s) —SO₂—Y are β-hydroxyethylsulfonyl groups (this starting compound can be prepared analogously to the abovementioned procedures according to the invention by starting from suitable starting compounds having a β-hydroxyethylsulfonyl group) and converting in this starting compound of the formula (1) where Y is β-hydroxyethyl the β-hydroxyethylsulfonyl groups into other groups —SO₂—Y of the compound (1) according to the invention in analogy to known procedures according to the invention, for example into their ester derivatives, such as, for example, of polyhydric inorganic acids or of aliphatic and aromatic carboxylic or sulfonic acids, for example in compounds in which Y is a β-chloroethyl, β-sulfatoethyl, β-phosphatoethyl, β-thiosulfatoethyl, β-acetyloxyethyl or β-toluenesulfonyloxyethyl group. Examples of suitable esterification and acylating agents for this reaction are the corresponding inorganic or organic acids, their anhydrides or halides or amides, such as, for example, sulfuric acid, sulfuric acid containing sulfur trioxide, chlorosulfonic acid, sulfamic acid, phosphoric acid, polyphosphoric acid, phosphorus oxychloride, mixtures of phosphoric acid and phosphorus pentoxide, acetic anhydride, toluenesulfonyl chloride and thionyl chloride.

The sulfation is carried out, for example, by reaction with concentrated sulfuric acid at temperatures between 0° and 20° C. or by reaction with chlorosulfonic acid in a polar organic solvent, such as, for example, N-methylpyrrolidone at a temperature between 10° and 80° C. Preferably, the sulfation is carried out by adding the starting dye which contains β-hydroxyethyl groups to sulfuric acid monohydrate at a temperature between 5° and 15° C.

Those compounds in which Y is a vinyl group can be prepared from their analogous ester derivatives by means of alkali, for example in an aqueous medium at a pH of 10 to 12 and a temperature between 30° and 50° C. and a reaction time of 10 to 20 minutes. The synthesis of, for example β-(dialkylamino)ethylsulfonyl and β-thiosulfatoethylsulfonyl derivatives is carried out by reaction of their vinylsulfonyl compounds with the corresponding dialkylamine or with an alkali metal salt of thiosulfuric acid, such as sodium thiosulfate. All these procedures of converting a group —SO₂—Y into another group are known to one skilled in this fiber-reactive area and have been described in large numbers in the literature.

The starting compounds of the general formula (17) can be prepared accordingly or analogously to the procedures in U.S. Pat. No. 3,758,470, mentioned at the beginning, the reaction taking place in aqueous or aqueous-organic medium in suspension or solution (the organic medium being, for example, acetone, dimethylformamide and N-methylpyrrolidone). This condensation reaction is preferably carried out at a temperature between −5° C. and +30° C., in particular between 0° and 5° C., and at a pH between 7 and 12, in particular between 8 and 10.

The starting compounds, such as, for example, diazo components, coupling components and triazines have been described in the literature in large numbers.

Aromatic radicals D of the diazo components D—NH₂ which carry a fiber-reactive group of the formula Y—SO₂— are, for example, those of the amines of the general formulae (4a) and (4b)

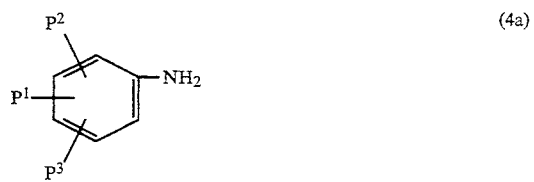

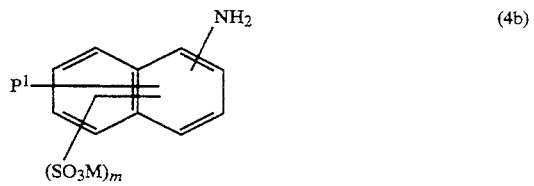

in which
p¹ is a radical of the formula (5a)

in which Y and p have the abovementioned meanings and r is the number zero, 1 or 2,
p² is hydrogen, methyl, ethyl, methoxy, ethoxy, alkanoyl of 2 to 5 carbon atoms, such as acetyl and propionyl, cyano, carboxyl, sulfo, alkoxycarbonyl of 2 to 5 carbon atoms, carbamoyl, N—($C_1$–$C_4$-alkyl) carbamoyl, fluorine, chlorine, bromine or trifluoromethyl, $p^3$ is hydrogen, methyl, ethyl, methoxy, ethoxy, cyano, carboxyl, sulfo, alkanoylamino of 2 to 5 carbon atoms, such as acetylamino, alkoxycarbonyl of 2 to 5 carbon atoms, carbamoyl, N—($C_1$–$C_4$-alkyl)-carbamoyl, fluorine, chlorine, nitro, sulfamoyl, N—($C_1$–$C_4$-alkyl)sulfamoyl, alkylsulfonyl of 1 to 4 carbon atoms, phenylsulfonyl or phenoxy, in which the benzene ring in formula (4a) and (4b) can additionally contain a hydroxy group in the ortho position relative to the amino group, m is the number zero, 1 or 2 (in which this group, in the case where p equals zero, is a hydrogen atom) and M has the abovementioned meaning.

Of these, $p^2$ is preferably hydrogen, methyl, methoxy, bromine, chlorine, carboxyl and sulfo and $p^3$ is hydrogen, methyl, methoxy, chlorine, carboxyl, sulfo and acetylamino.

The groups "sulfo" "carboxyl" "phosphato" "thiosulfato" and "sulfato" include their acid form as well as their salt form. Accordingly, sulfo groups are groups corresponding to the general formula —$SO_3M$, carboxyl groups are groups corresponding to the general formula —COOM, phosphato groups are groups corresponding to the general formula —$OPO_3M_2$, thiosulfato groups are groups corresponding to the general formula —S—$SO_3M$ and sulfato groups are groups corresponding to the general formula —$OSO_3M$, where M has in each case the abovementioned meaning.

Aromatic amines of the diazo component Z—D—$NH_2$ containing the fiber-reactive radical Z are preferably derived from aromatic amines of the general formulae (4c) and (4d)

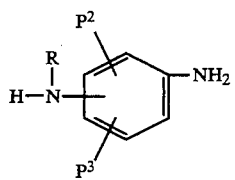
(4c)

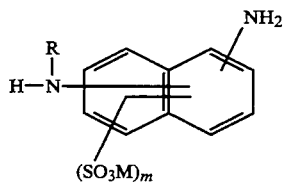
(4d)

in which R, M, m, $p^2$ and $p^3$ have the abovementioned, in particular preferred, meanings, in which the benzene ring in formulae (4c) and (4d) can additionally contain a hydroxyl group in the ortho position relative to the amino group —$NH_2$.

Diamino starting compounds such as those of the formulae (4c) and (4d), which can be used as diazo components for the synthesis of the azo compounds according to the invention, are, for example: 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,4-diamino-naphthalene-2-sulfonic acid, 2,6-diaminonaphthalene-8-sulfonic acid, 2,6-diaminonaphthalene-4,8-disulfonic acid, 1,4-diaminonaphthalene-6-sulfonic acid, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2-carboxylic acid, 1,4-diaminobenzene-2,5-disulfonic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5sulfonic acid, 1,5-diamino-6-methylbenzene-3-sulfonic acid, 1,3-diamino-6-methylbenzene-4-sulfonic acid, 3-(3'-aminobenzoylamino)-1-aminobenzene-6-sulfonic acid, 3-(4'-aminobenzoylamino)-1-aminobenzene-6-sulfonic acid, 1-(4'-aminobenzoylamino)-4-aminobenzene-2,5-disulfonic acid, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-l-sulfonic acid, 2-amino-5-aminomethylnaphthalene-1,7-disulfonic acid.

If in the synthesis according to the invention, as mentioned above, an aminoalkanoylamino compound from which the alkanoyl group, such as, for example, the acetyl group, is cleaved off again afterwards by hydrolysis is used as diazo component instead of a diamine, the monoalkanoyl compounds of the abovementioned diazo components are suitable, such as, for example, 1-acetylamino-3-aminobenzene-4-sulfonic acid and 1-acetylamino-4-aminobenzene-3-sulfonic acid.

Starting amines containing a group Y—$SO_2$—, such as, for example, those of the formulae (4a) and (4b), are, for example, 2-($\beta$-sulfatoethylsulfonyl)aniline, 3-($\beta$-sulfatoethylsulfonyl)aniline, 4-($\beta$-sulfatoethylsulfonyl)aniline, 2-carboxy-5-($\beta$-sulfatoethylsulfonyl)aniline, 2-chloro-3-($\beta$-sulfatoethylsulfonyl)aniline, 2-chloro-4-($\beta$-sulfatoethylsulfonyl)aniline, 2-ethoxy-4- or -5-($\beta$-sulfatoethylsulfonyl)aniline, 2-ethyl-4-($\beta$-sulfatoethylsulfonyl)aniline, 2-methoxy -5-($\beta$-sulfatoethylsulfonyl) aniline, 2,4-diethoxy-5-($\beta$-sulfatoethylsulfonyl)aniline, 2,4-dimethoxy-5-($\beta$-sulfatoethylsulfonyl) aniline, 2,5-dimethoxy-4- ($\beta$-sulfatoethylsulfonyl) aniline, 2 -methoxy-5-methyl-4-($\beta$-sulfatoethylsulfonyl) aniline, 2- or 3- or 4- ($\beta$-thiosulfatoethylsulfonyl)aniline, 2-methoxy-5-($\beta$-thiosulfatoethylsulfonyl)aniline, 2-sulfo-4-($\beta$-phosphatoethylsulfonyl)aniline, 2-sulfo-4-vinylsulfonylaniline, 2-hydroxy-4- or -5-($\beta$-sulfatoethylsulfonyl)aniline, 2-chloro-4- or -5-($\beta$-chloroethylsulfonyl)aniline, 2-hydrory-3-sulfo-5-($\beta$-sulfatoethylsulfonyl) aniline, 3- or 4-($\beta$-acetoxyethylsulfonyl)aniline, 2-methoxy-4-[$\beta$-(N-methyltauryl)-ethylsulfonyl]aniline, 5-($\beta$-sulfatoethylsulfonyl)-2-aminonaphthalene, 6- or 7- or 8-($\beta$-sulfatoethylsulfonyl)-2-aminonaphthalene, 6-(β-sulfatoethylsulfonyl)-1-sulfo-2-aminonaphthalene, 5- (β-sulfatoethylsulfonyl)-1-sulfo-2-aminonaphthalene, 8-(β-sulfatoethylsulfonyl)-6-sulfo-2-aminonaphthalene.

Preferred radicals D or $D^1$ in the formulae (2) and (4) containing a fiber-reactive group Y—$SO_2$— or Z, are those of the general formulae (6a) to (6d):

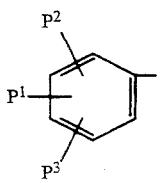
(6a)

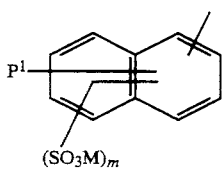
(6b)

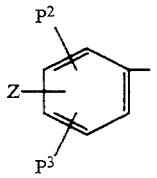
(6c)

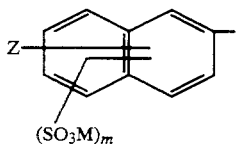
(6d)

in which $p^1$, $p^2$, $p^3$, Z, m and M have the abovementioned meanings.

Aromatic radicals E of a coupleable and diazotizable compound of the general formula H—E—$NH_2$ are, for example, those of the general formulae (7a), (7b) and (7c)

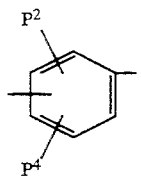
(7a)

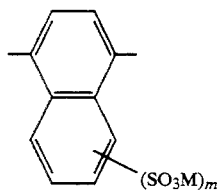
(7b)

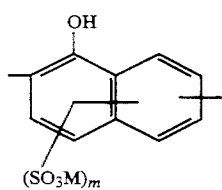
(7c)

in which
$p^2$, M and m have the abovementioned meanings and $p^4$ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido of 1 to 4 carbon atoms in the alkyl radical, phenylsulfonyl or alkylsulfonyl of 1 to 4 carbon atoms.

Compounds of the general formula H—E-$NH_2$ are, for example, aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-aminonaphthalene, 1-aminonaphthalene-6-or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, 3-propionylaminoaniline, 3-butyrylaminoaniline, 2-sulfo-5-acetylaminoaniline, 2-amino-5-naphthol-7-sulfonic acid and 2-amino-8-naphthol-6-sulfonic acid.

The radicals K of the coupling component are preferably derived from the aniline, naphthalene, pyrazole and acylacetarylide series; they can contain fiber-reactive groups.

Coupling components of the formula H-K of the aniline and naphthalene series are, for example, the anilines, N- mono- and N,N-disubstituted anilines, m-phenylenediamines and their derivatives, naphtholsulfonic acids, aminonaphthalenes, naphthols, hydroxynaphthoic acid derivatives, aminonaphthalenesulfonic acids or aminonaphtholsulfonic acids.

Coupling components of the formula H—K—(-$SO_2$—Y$)_p$ are, for example, compounds of the general formulae (8a) to (8f)

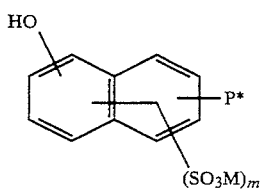
(8a)

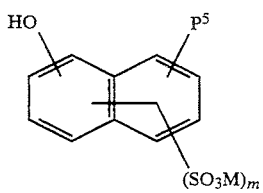
(8b)

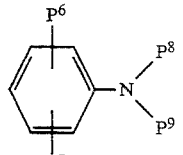
(8c)

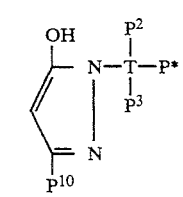
(8d)

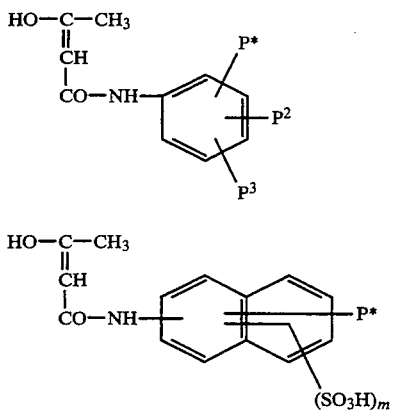

in which
p², p³, m and M have the abovementioned meanings,
p* is a radical of the formula $(-SO_2-Y)_p$ where Y and p have the abovementioned, in particular preferred, meaning or is a radical of the formula (5b)

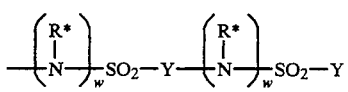

in which
R* is methyl or ethyl,
w is the number zero or 1 and
Y has the abovementioned meaning, p⁵ is phenylureido which is substituted in the phenyl radical by chlorine, methyl, methoxy, sulfo and/or carboxyl and by a group $-SO_2-Y$ where Y has the abovementioned meaning, or is benzoylamino which is substituted in the benzene radical by chlorine, methyl, methoxy, nitro, sulfo and/or carboxyl and by a group $-SO_2-Y$ where Y has the abovementioned meaning, p⁶ is hydrogen, alkyl of 1 to 4 carbon atoms, such as methyl and ethyl, alkoxy of 1 to 4 carbon atoms, such as methoxy and ethoxy, bromine, chlorine or alkanoylamino of 2 to 7 carbon atoms, such as acetylamino and propionylamino, p⁷ is hydrogen, alkyl of 1 to 4 carbon atoms, such as methyl and ethyl, alkoxy of 1 to 4 carbon atoms, such as methoxy and ethoxy, chlorine or alkanoylamino of 2 to 7 carbon atoms, such as acetylamino and propionylamino, ureido or phenylureido, p⁸ is hydrogen or alkyl of 1 to 4 carbon atoms, which can be substituted by hydroxy, cyano, carboxyl, sulfo, sulfato, methoxycarbonyl, ethoxycarbonyl or acetoxy or a group $-SO_2-Y$ of the above definition, p⁹ is alkyl of 1 to 4 carbon atoms, which can be substituted by hydroxyl, cyano, carboxyl, sulfo, sulfato, methoxycarbonyl, ethoxycarbonyl or acetoxy and is substituted by a group $-SO_2-Y$ of the above definition, or is benzyl or phenyl or phenyl which is substituted by alkyl of 1 to 4 carbon atoms, alkoxy of 1 to 4 carbon atoms, chlorine and/or sulfo, the phenyl radical being substituted by a group $-SO_2-Y$ of the above definition, p¹⁰ is hydrogen, alkyl of 1 to 4 carbon atoms, such as methyl, cyano, carboxyl, carbalkoxy of 2 to 5 carbon atoms, such as carbomethoxy and carbethoxy, carbamoyl or phenyl, preferably methyl, carboxyl, methoxycarbonyl, ethoxycarbonyl or phenyl and in particular methyl or carboxyl, and T is a benzene or naphthalene ring, preferably a benzene ring.

Compounds of the general formula (8) are, for example, 1-[3'- (β-chloroethylsulfonyl) benzoylamino]-3,6-disulfo-8naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-(β-sulfatoethylsulfonyl)benzoylamino]-4,6-disulfo-8-naphthol, 2-[3'-(β-chloroethylsulfonyl)benzoylamino]-6-sulfo-8-naphthol, 2-[3'-(vinylsulfonyl)benzoylamino]-6-sulfo-8-naphthol, 3-[3'-(β-chloroethylsulfonyl)benzoylamino]-6-sulfo-8-naphthol, 3-[3'-(vinylsulfonyl)benzoylamino]-6-sulfo-8-naphthol, 2-[N-methyl-N-(β-sulfatoethylsulfonyl) amino]-6-sulfo-8-naphthol, 3-[N-methyl-N-(β-sulfatoethylsulfonyl)amino]-6-sulfo-8-naphthol, 2-[N-ethyl-N-(β-sulfatoethylsulfonyl)amino]-6-sulfo-8-naphthol, 1-[N'-(3'-β-chloroethylsulfonylphenyl)ureido]-3,6-disulfo-8-naphthol, 1-[N'-(3'-vinylsulfonylphenyl)ureido]-3,6-disulfo-8-naphthol, 1-[N'-(3'-vinylsulfonylpropyl)ureido]-3,6-disulfo-8-naphthol, 1-[N'-(3'-β-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-chloroethylsulfonylpropyl)ureido]-4,6-disulfo-8-naphthol, 2-[N'-(3'-β-sulfatoethylsulfonylphenyl)ureido]-6-sulfo-8-naphthol, 2-[N'-(3'-β-chloroethylsulfonylpropyl)ureido]-6-sulfo-8-naphthol, 3-[N'-(3'-β-chloroethylsulfonylphenyl) ureido]-6-sulfo-8-naphthol, 3-[N'-(3'-vinylsulfonylpropyl) ureido]-6-sulfo-8-naphthol, 1-[4'-(β-sulfatoethylsulfonyl) -2'-sulfo]phenyl-3-methylpyrazol-5-one, 1-[4'-(β-sulfatoethylsulfonyl)phenyl]-3-carboxypyrazol-5-one, 1-[4'-(β-sulfatoethylsulfonyl)phenyl]-3-methylpyrazol-5-one, 1-[3'-(β-sulfatoethylsulfonyl)phenyl]-3-carboxypyrazol-5-one, 1-[3'-(β-sulfatoethylsulfonyl)phenyl]-3-methylpyrazol-5-one, 1-(4'-sulfophenyl)-3-carboxypyrazol-5-one, 1-(4'-β-sulfatoethylsulfonylphenyl) -3-carbomethoxy-5-pyrazolone, 1-(3'-β-sulfatoethylsulfonyl-phenyl) -3-carbomethoxy-5-pyrazolone, 4-hydroxy-6-[N-methyl-N-(β-sulfatoethylsulfonyl)amino]naphthalene-2-sulfonic acid, 4-hydroxy-6-[N-ethyl-N-(β-sulfatoethylsulfonyl)amino]naphthalene-2-sulfonic acid, 4-hydroxy-7-[N-methyl-N-(β-sulfatoethylsulfonyl) amino]naphthalene-2-sulfonic acid, 4-hydroxy-7-[N-ethyl-N-(β-sulfatoethylsulfonyl)amino]naphthalene-2-sulfonic acid and acetoacetyl-(4-β-sulfatoethylsulfonyl) aniline. Further suitable coupling components H—K are in particular: 1-amino-8-hydroxynaphthalene-3,6- and [lacuna]4,6-disulfonic acid and their arylazo coupling products obtained by acid coupling of the formula (9a)

HO    NH₂   (9a)
[structure with N=N—D¹, MO₃S, SO₃M]

in which D¹ is a radical of the formula (10a), (10b) or (10c)

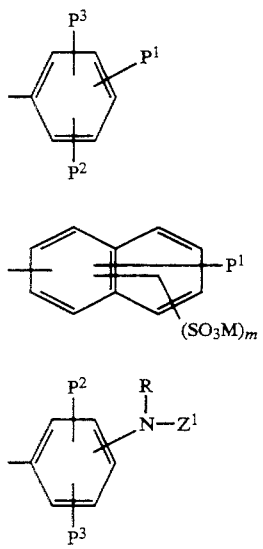
(10a)

(10b)

(10c)

in which R, p¹, p², p³, m and M have the abovementioned meanings and Z¹ is a radical of the general formula (3a) shown below.

Coupling components which, according to the invention, contain the fiber-reactive group of the formula (3) or into which the fiber-reactive group can be introduced, if desired even after the coupling reaction, are, for example, compounds of the general formulae (11a) to (11h) or their Z-free precursors (i.e. compounds containing the group —N(R)—H instead of the group —N(R)—Z¹):

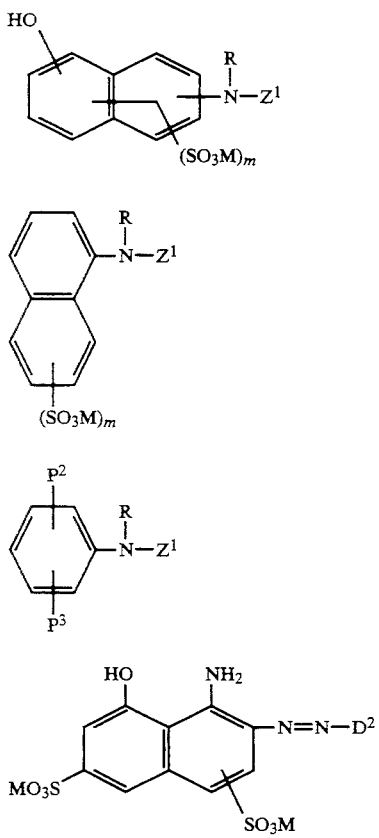
(11a)

(11b)

(11c)

(11d)

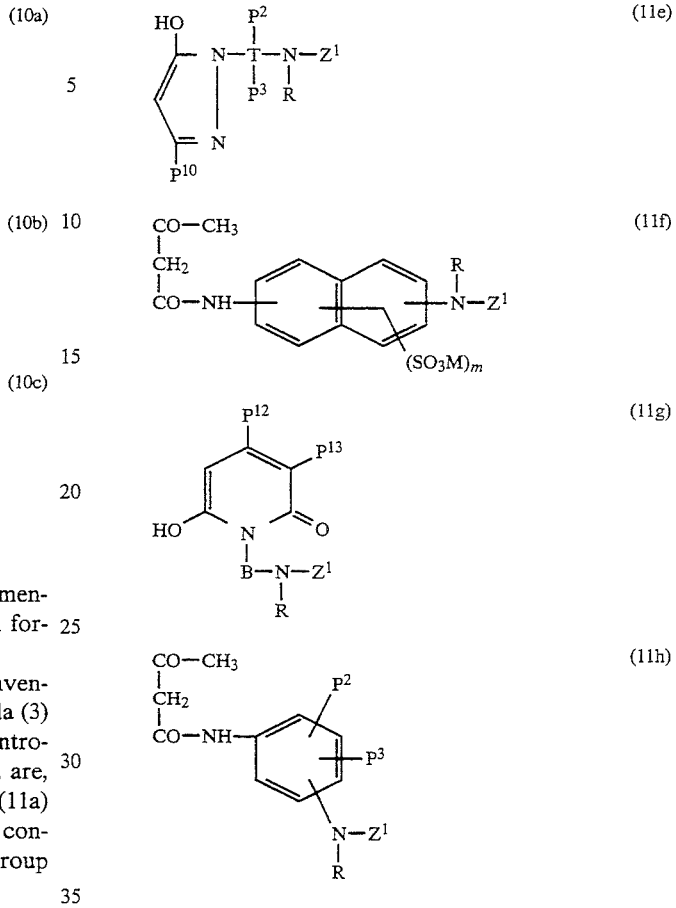
(11e)

(11f)

(11g)

(11h)

in which R

R, p², p³, p¹⁰, p¹², p¹³, D², M, m and T have the abovementioned, in particular preferred, meanings, D² is a radical of the abovementioned general formula (10c), B is alkyl of 1 to 4 carbon atoms, benzyl or phenethyl or phenyl, or benzyl, phenethyl or phenyl which is substituted in the benzene radical by fluorine, chlorine, bromine, methyl, methoxy, cyano, sulfo, carboxyl, acetyl, nitro, carbamoyl and/or sulfamoyl, in which in the case of "benzyl" and "phenethyl" the group —N(Rˣ)—Z¹ is bound to the benzene ring, and Z¹ is a group of the general formula (3a)

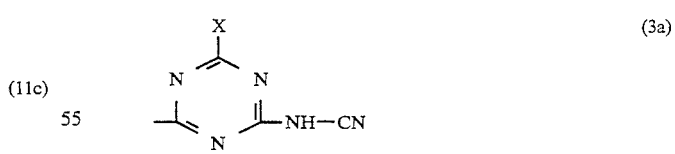
(3a)

where X has one of the abovementioned meanings.

Those coupling components which contain a group of the general formula —NHR defined above or their alkanoyl derivative, the alkanoyl group of which can, if desired or required, subsequently be cleaved off hydrolytically, are, for example: aniline, 3-methylaniline, 3-chloroaniline, 2,5-dimethyl-aniline, 2,5-dimethoxyaniline, 3-methoxyaniline, 3-methyl-6-methoxyaniline, 3-aminophenylurea, 3-acetyl-amino-6-methylaniline, 2-amino-4-acetylaminobenzene-1-sulfonic acid, 1-aminonaphthalene, 1-aminonaphthalene-6-or -7- or -8- sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, 4-(phenylazo)aniline, 3-propionylaminoaniline, 3-butyrylaminoaniline, 2-sulfo-5-acetylaminoaniline, 2-amino-5-naphthol-7-sulfonic acid, 2-amino-8-naphthol-6-sulfonic acid, 6-methylamino-3-sulfo-1-naphthol, 1-amino-3,6- or -4,6-disulfo-8-naphthol, 6-amino-3,5-disulfo-1-naphthol, 6-(4'-aminophenyl)amino-3-sulfo-1-naphthol, 1-amino-2,4-disulfo-8-naphthol, 1-(4'-aminobenzoylamino)-3,6-disulfo-8-naphthol, 1-(3'-aminobenzoylamino) -3,6-disulfo-8-naphthol, 1-(4'-amino-2'-sulfophenyl) -3-carboxy-5-pyrazolone, 1-(4'-amino-2'-sulfophenyl) -3-methyl-5-pyrazolone, 1-(3'-sulfo-6'-methyl-5'-aminophenyl) -3-carboxy-5-pyrazolone, 1-{4'-[N'-(4''-sulfo-3''-aminophenyl)carbamoyl]phenyl}-3-methyl- or -3-carboxy-5-pyrazolone, N-(3,5-disulfo-4-amino)acetoacetylanilide, N-(3-sulfo-4-amino-6-methoxy)acetoacetylanilide, 2-hydroxy-5-carbamoyl-4-methyl-l-(β-aminoethyl)-6-pyridone and 2-hydroxy-5-sulfomethyl-4-methyl-l-(β-aminoethyl)-6-pyridone, 1-amino-8-hydroxynaphthalene-4sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, amino-8-hydroxynaphthalene-2,4,6-trisulfonic acid, hydroxy-8-acetylaminonaphthalene-3-sulfonic acid, amino-5-hydroxynaphthalene-7-sulfonic acid, 2-methyl- and 2-ethylamino-5-hydroxynaphthalene-7-sulfonic acid, 2-(N-acetyl-N-methylamino) -5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino- or 2-ethylamino-8-hydroxynaphthalene-6-sulfonic acid, 2-(N-acetyl-N-methylamino-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6or -4,6-disulfonic acid, 2-(4'-amino-3'-sulfophenylamino)-5-hydroxynaphthalene -7-sulfonic acid, 1-(3'-aminophenyl) -3-methyl-5-pyrazolone, 2,4,6-triamino-3-cyanopyridine, 1-amino-8-hydroxy-2-(4'-sulfophenylazo)naphthalene-3,6-disulfonic acid, 1-amino-8-hydroxy-2-(2',5'-disulfonephenylazo) naphthalene-3,6-disulfonic acid [sic], 1-(β-aminoethyl)-3-cyano-4-methyl-6-hydroxy-2-pyridone, 1-(7-aminopropyl)-3-sulfomethyl-4-methyl-6-hydroxy-2-pyridone, 1,3-diaminobenzene, 1-amino-3—N,N-di(β-hydroxyethyl)aminobenzene, 1-amino-3—N,N-di(β-sulfatoethyl)aminobenzene, 1-amino-3—N,N-di(β-hydroxyethyl) amino-4-methoxybenzene, 1-amino-3—N,N-di(β-sulfatoethyl) -amino-4-methoxybenzene, 1-amino-3-sulfobenzylaminobenzene, 1-amino-3-sulfobenzylamino-4-chlorobenzene, 1-amino-3—N,N-di(sulfobenzyl)aminobenzene.

Aromatic diamines derived from the radical of the formula (10c) are, for example, those which have the abovementioned formula (4c) and have been mentioned there, for example, individually.

The compounds of the general formulae (11b) and (11c) themselves cannot be used as coupling components. The coupling components which serve for the synthesis of the azo dyes according to the invention are their $Z^1$-free precursors, i.e. their precursors which contain an amino group of the formula —N(R)—H instead of the group —N(R)—$Z^1$. After coupling these amino-containing precursors onto a suitable diazo component to give the azo compound, the fiber-reactive radical $Z^1$ can be introduced into the amino group —N(R)—H by means of a compound of the general formula Hal—$Z^1$, in which Hal is a halogen atom, preferably a fluorine or chlorine atom, and $Z^1$ has the abovementioned meaning. Analogously, the $Z^1$-free amino compounds of the compounds of the general formulae (11a) and (11d) to (11h) themselves can also first serve as coupling components to prepare an aminoazo starting compound, into which the fiber-reactive radical can then be introduced in the same manner. The coupling components containing the fiber-reactive radical $Z^1$ of the general formulae (11a) and (11d) to (11h) themselves can also be prepared by reaction of these $Z^1$-free amino-containing starting compounds with a compound of the formula Hal—$Z^1$ analogously to known procedures.

Instead of the radical $Z^1$, other known fiber-reactive radicals can likewise be introduced into the amino groups of the amino-containing coupling components or their aminoazo starting compounds, if those azo dyes according to the invention in which the diazo component contains the fiber-reactive grouping Z according to the invention are intended to be prepared. In principle, all known fiber-reactive acylating agents are suitable for this reaction.

Radicals K in the general formulae (2a) and (2b) which contain a fiber-reactive group —$SO_2$—Y are in particular radicals of the general formulae (12a) to (12h)

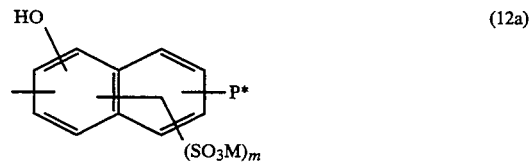
(12a)

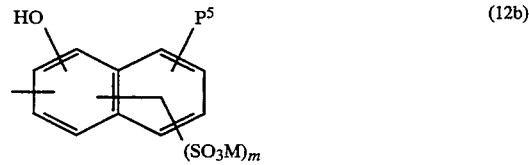
(12b)

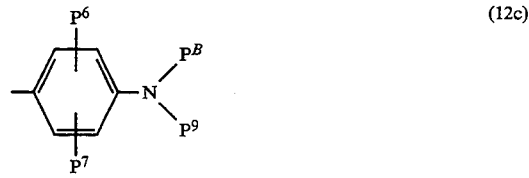
(12c)

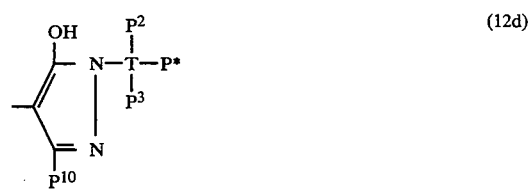
(12d)

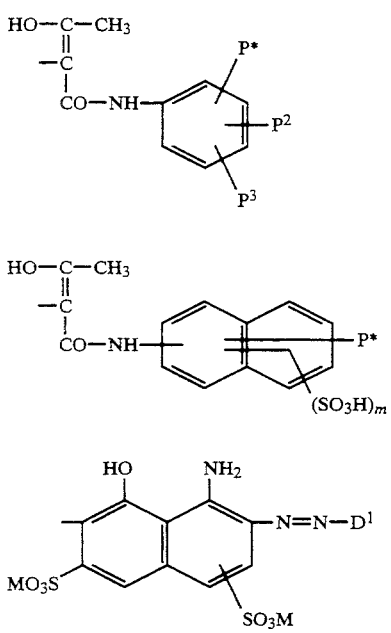

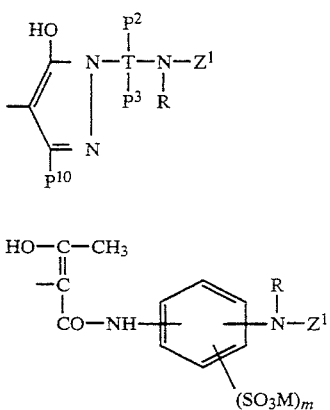

in which the individual formula members have the abovementioned meanings.

Radicals K in the general formulae (2a) and (2f) which contain the group Z are in particular radicals of the general formula (12j) to (12p)

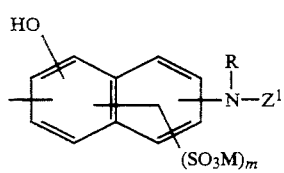

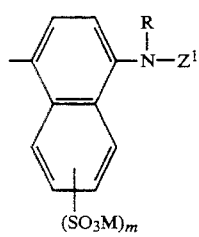

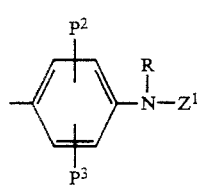

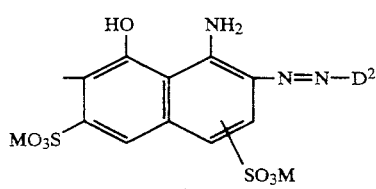

in which the individual formula members have the abovementioned meanings.

Radicals K of the general formula (2f) which contain an oxygen atom bound to a metal complex and contain a fiber-reactive group —SO₂—Y or Z (where v is zero) are in particular those of the formulae (13a) to (13f)

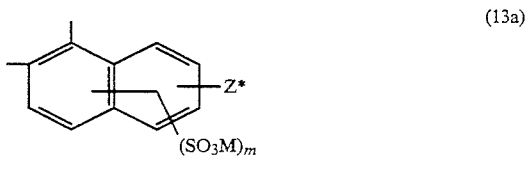

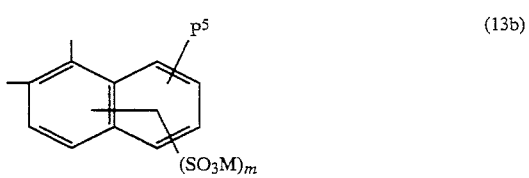

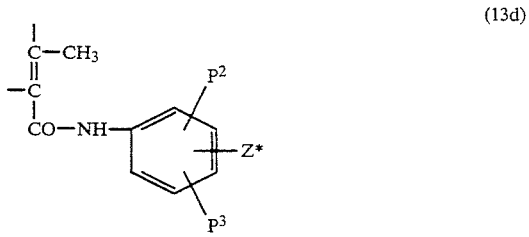

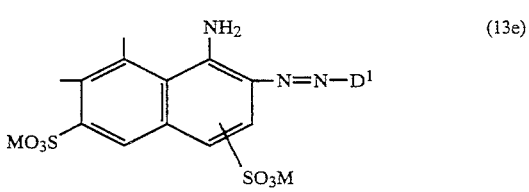

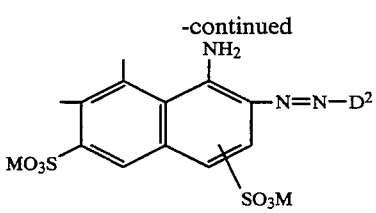

in which $Z^*$ has one of the meanings of $P^1$ or Z and the individual formula members have one of the abovementioned meanings.

Radicals K in the general formula (2f) which contain an oxygen atom bound to a metal complex in the case where v is 1 are in particular those of the formulae (13g) and (13h)

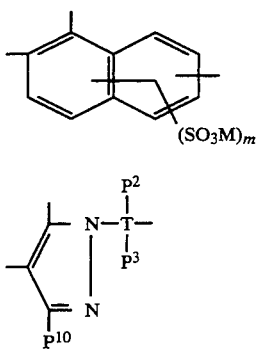

in which the individual formula members have one of the abovementioned meanings.

Halogenotriazine compounds of the general formula (13) are, for example, 2,4,6-trichloro-1,3,5-triazine (cyanuric chloride), 2,4,6-tribromo-1,3,5-triazine (cyanuric bromide), 2-methylsulfonyl-4,6-dichloro-1,3,5-triazine and 2-phenylsulfonyl-4,6-dichloro-1,3,5-triazine.

In all of the above formulae, the individual formula members, whether they have the same or different designation within a general formula, can, as far as their meaning is concerned, have meanings which are identical to one another or different from one another.

The dyes according to the invention of the formula (1) are suitable for the dyeing and printing of a wide range of materials, such as silk, leather, wool, polyamide fibers and polyurethanes, and in particular cellulose-containing fiber materials of any type. Examples of these fiber materials are natural cellulose fibers, such as cotton, linen and hemp, and cellulose and regenerated cellulose. The dyes of the formula (1) are also suitable for the dyeing or printing of hydroxyl-containing fibers which are contained in mixed fabrics, for example of mixtures of cotton with polyester fibers or polyamide fibers.

The dyes according to the invention can be applied to the fiber material and fixed on the fiber by various methods, in particular in the form of aqueous dye solutions and color print pastes. They are suitable not only for the exhaust process but also for dyeing by the padding method, in which the material is impregnated with aqueous dye solutions which may contain salts and the dye is fixed after an alkali treatment or in the presence of alkali, if necessary with exposure to heat. The dyes according to the invention are particularly suitable for the cold pad-batch method, in which the dye is applied together with alkali on a pad-mangle and is then fixed leaving it at room temperature for several hours. After fixing, the dyes or prints are thoroughly rinsed witch cold and hot water, if necessary with the addition of an agent which acts as a dispersant and promotes the diffusion of the unfixed portions.

The present invention accordingly also relates to the use of the compounds according to the invention of the general formula (1) for the dyeing (including printing) of these materials and to processes for the dyeing (and printing) of these materials by a procedure customary per se, in which a compound of the general formula (1) is used as a colorant and the compound of the general formula (1) is applied to the material in aqueous medium and fixed in the heat or by means of an alkaline compound or by means of both.

The dyes of the formula (1) are distinguished by high reactivity, good fixation properties and very good build-up properties. They can therefore be used in the exhaust method at low dyeing temperatures and require only short steaming times in the pad-steam process. The degrees of fixation are high and the unfixed portions can easily be washed off, the difference between the degree of exhaustion and degree of fixation being remarkably small, i.e. the soap loss is very small.

The dyes of the formula (1) are also in particular suitable for printing, in particular on cotton, but also for the printing of nitrogen-containing fibers, for example of wool or silk or of mixed fabrics which contain wool or silk.

The dyeings and prints on cellulose fiber materials produced by the dyes according to the invention have a high color strength and a high stability of the dye/fiber linkage not only in the acidic but also in the alkaline range, furthermore good light fastness and very good wet fastness properties, such as wash, water, sea water, cross-dyeing and perspiration fastness properties and also good pleating fastness, hot press fastness and rub fastness.

The examples which follow serve to illustrate the invention. The parts and percentages are by weight, unless stated otherwise. Parts by weight relate to parts by volume as the kilograin relates to the liter.

The compounds described in these examples by way of their formulae are given in the form of the free acids; in general, they are prepared and isolated in the form of their alkali metal salts, such as lithium salts, sodium salts or potassium salts, and are used for dyeing in the form of their salts.

Likewise, the starting compounds and components mentioned in the examples below, in particular the table examples, in the forth of the free acid can be used in the synthesis as such or in the form of their salts, preferably the alkali metal salts.

The absorption maxima ($\lambda_{max}$) in the visible region shown for the compounds according to the invention were determined, using their alkali metal salts in aqueous solution. In the table examples, the $\lambda_{max}$ values are written in brackets next to their hues; the wavelength numbers are given in nm.

EXAMPLE 1

4.25 parts of cyanamide are added to a finely divided suspension of 19 parts of cyanuric chloride in 200 parts of ice water, the mixture is brought to a pH of 8.5 to 9 with sodium hydroxide solution and subsequently stirred for about 1 hour at 0° to 3° C. and a pH of 8.5. After the condensation reaction is completed (which can be checked by thin layer chromatography), the resulting solution is brought to a pH of 5 with hydrochloric acid. 23.9 parts of 4-hydroxy-7-aminonaphthalene-2-sulfonic acid are added, and the mixture is stirred for another 2 hours at 20° C. and a pH of 3 to 3.5. A sulfuric acid aqueous suspension prepared in the usual manner (about 320 parts) of the diazonium salt of 41.1 parts of 2-amino-8-(β-sulfatoethylsulfonyl)naphthalene-6-sulfonic acid is then added, and the coupling reaction is carried out at a temperature of 10° to 25° C. and a pH of 6 to 6.5. After adjusting the pH to a value of 5.5 and adding kieselguhr, the synthesis solution is clarified at 40° to 50° C. by filtration, and the filtrate is evaporated to dryness at 50° C. under reduced pressure.

This gives a red electrolyte-containing powder of the alkali metal salt (sodium salt) according to the invention of the compound of the formula

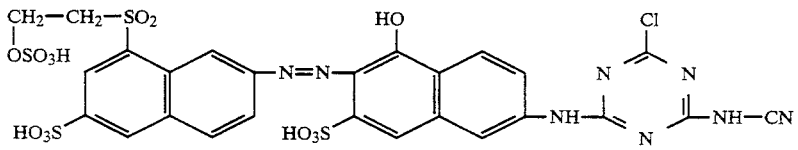

($\lambda_{max}$ = 491 nm).

The compound according to the invention has very good fiber-reactive dye properties and dyes the materials mentioned in the description such as, in particular, cellulose fiber materials, for example cotton, by the application and fixation processes customary in the art for fiber-reactive dyes, in brilliant orange shades which have high color strength and good fastness properties, of which their good water, wash, perspiration, hypochlorite bleaching and hot-press fastness properties may be mentioned in particular.

EXAMPLE 2

31.9 parts of 4-hydroxy-5-aminonaphthalene-2,7-disulfonic acid are added to a finely divided suspension of 19 parts of cyanuric chloride in 200 parts of ice water, and the condensation reaction is first carried out at 0° to 5° C. and a pH of 1.8 to 2.2 for about 3 hours and then at 0° to 20° C. and a pH of 4.5 for about 1 hour. 4.25 parts of cyanamide are then added, the pH is brought to 10 with aqueous sodium hydroxide solution, the mixture is slowly heated to 50° to 60° C. and stirred at this temperature and a pH of 9.5 to 10 for another 2 hours, until the reaction is complete. The pH is then brought to 5 with hydrochloric acid, a sulfuric acid aqueous suspension prepared in the usual manner (about 340 parts) of the diazonium sodium salt of 28.1 parts of 4-(α-sulfatoethylsulfonyl)aniline is added, and the coupling reaction is carried out at 10° to 15° C. and a pH of 4.5. Kieselguhr is then added to the synthesis solution, the mixture is heated to 40° to 50° C., the pH is brought to 5.5, the mixture is filtered, and the azo compound according to the invention is isolated by evaporating the filtrate under reduced pressure.

The azo compound according to the invention isolated as the alkali metal salt (sodium salt) has, written in the form of the free acid, the formula

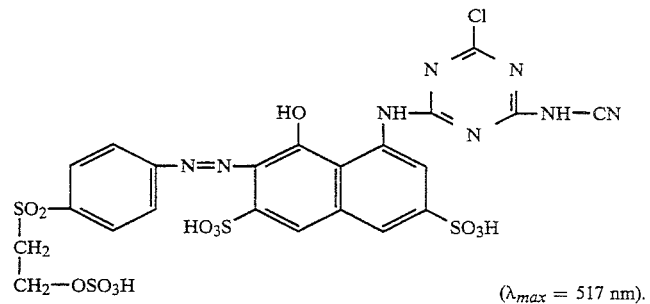

($\lambda_{max}$ = 517 nm).

It produces, for example on cotton, by the application and fixation processes customary in the art for fiber-reactive dyes red dyeings and prints which have good fastness properties, of which in particular their good wash, perspiration, water and hot-press fastness properties may be mentioned.

EXAMPLE 3

66.1 parts of 3-[1'-sulfo-6'-(β-hydroxyethylsulfonyl)-2'-naphthylazo]-4-hydroxy-5-aminonaphthalene-2,7-disulfonic acid are reacted in aqueous solution at a temperature of 0° to 5° C. and a pH of 4 with 19 parts of cyanuric chloride. 4.3 parts of cyanamide are then added, and the second condensation reaction is carried out while steadily increasing the pH to 10 by means of aqueous sodium hydroxide solution and the temperature to 50° to 60° C. and subsequently at this temperature and a pH of 9.5 to 10 for about 2 hours. The azo compound formed, which contains the β-hydroxyethylsulfonyl group, is salted out from the synthesis solution at a pH of 7 by means of potassium chloride, isolated and dried.

10 parts of the product obtained, which contains about 70% of the azo compound, are stirred into 20 parts of 100% sulfuric acid at 5° to 10° C. After the azo compound is completely dissolved, the mixture is poured onto 80 parts of ice, neutralized with calcium carbonate, filtered off from the calcium sulfate with suction, the residue is washed with water, and the filtrate is evaporated to dryness under reduced pressure.

The azo compound according to the invention, which is obtained as the alkali metal salt and has the formula (written in the form of the free acid)

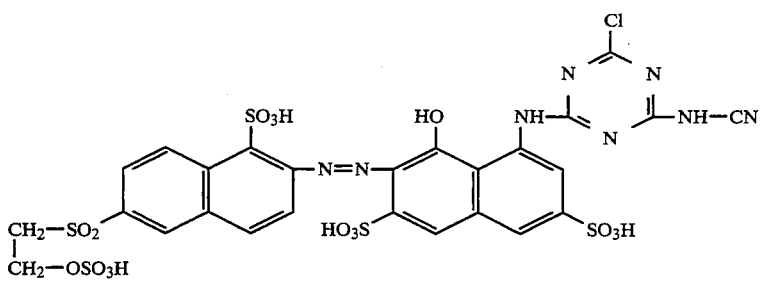

($\lambda_{max}$ = 538 nm).

dyes the materials mentioned in the description, such as, in particular, cotton, by the application processes customary in the art for fiber-reactive dyes in brilliant bluish red shades which have high color strength and good fastness properties, of which in particular the good daylight fastness and good hot-press fastness may be mentioned.

EXAMPLES 4 TO 56

Further azo dyes according to the invention of a general formula (A)

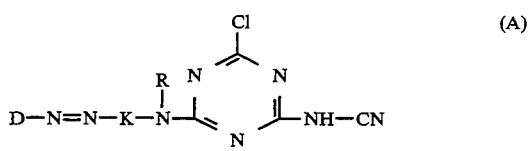

are described in the table examples below by means of the formula radicals of the general formula (A). They can be prepared according to the invention, for example analogously to the above exemplary embodiments, using the starting components shown in the general formula (A) (for example the diazo component D—NH$_2$, the coupling component H—K—NHR, cyanuric chloride and cyanamide). They have very good fiber-reactive dye properties and dye the materials mentioned in the description, such as, in particular, cellulose fiber materials, for example cotton, by the application and fixation processes customary in the art for fiber-reactive dyes, in the hues shown in the particular table example (in this case also cotton) which have high color strength and good fastness properties.

| Ex. | Radical D— | Radical —K—N(R)— | Hue |
|---|---|---|---|
| 4 | 4-(β-sulfatoethyl-sulfonyl)phenyl | 3-amino-4-sulfo-1,6-phenylene-amino | golden yellow |
| 5 | 3-(β-sulfatoethyl-sulfonyl)phenyl | 3-amino-4-sulfo-1,6-phenylene-amino | golden yellow |
| 6 | 6-(β-sulfatoethyl-sulfonyl)-1-sulfo-naphth-2-yl | 3-amino-4-sulfo-1,6-phenylene-amino | golden yellow |
| 7 | 2-sulfo-4-(β-sulfato-ethylsulfonyl)phenyl | 3-amino-4-sulfo-1,6-phenylene-amino | golden yellow |
| 8 | 8-(β-sulfatoethyl-sulfonyl)-6-sulfo-naphth-2-yl | 3-amino-4-sulfo-1,6-phenylene-amino | golden yellow |
| 9 | 8-(β-sulfatoethyl-sulfonyl)-6-sulfo-naphth-2-yl | 3-ureido-1,4-phenyleneamino | reddish yellow |
| 10 | 8-(β-sulfatoethyl-sulfonyl)-6-sulfo-naphth-2-yl | 3-acetylamino-1,4-phenylene-amino | reddish yellow |
| 11 | 8-(β-sulfatoethyl-sulfonyl)-6-sulfo-naphth-2-yl | 3-methyl-1,4-phenyleneamino | reddish yellow |
| 12 | 6-(β-sulfatoethyl-sulfonyl)-1-sulfo-naphth-2-yl | 3-methyl-1,4-phenyleneamino | reddish yellow |
| 13 | 6-(β-sulfatoethyl-sulfonyl)-1-sulfo-naphth-2-yl | 3-acetylamino-1,4-phenylene-amino | reddish yellow |
| 14 | 6-(β-sulfatoethyl-sulfonyl)-1-sulfo-naphth-2-yl | 3-ureido-1,4-phenyleneamino | reddish yellow |
| 15 | 6-vinylsulfonyl-1-sulfonaphth-2-yl | 3-acetylamino-1,4-phenylene-amino | reddish yellow |
| 16 | 4-(β-sulfatoethyl-sulfonyl)phenyl | 1-[2'-sulfo-1',4'-phenylene-4'-amino]-3-carboxypyrazol-5-on-4-yl | yellow |
| 17 | 2-sulfo-4-(β-sulfato-ethylsulfonyl)phenyl | 1-[2'-sulfo-1',4'-phenylene-4'-amino]-3-carboxypyrazol-5-on-4-yl | yellow |
| 18 | 6-(β-sulfatoethyl-sulfonyl)-1-sulfo-naphth-2-yl | 1-[2'-sulfo-1',4'-phenylene-4'-amino]-3-carboxypyrazol-5-on-4-yl | yellow |
| 19 | 8-(β-sulfatoethyl-sulfonyl)-6-sulfo-naphth-2-yl | 1-[2'-sulfo-1',4'-phenylene-4'-amino]-3-carboxypyrazol-5-on-4-yl | yellow |
| 20 | 2-methoxy-4-(β-sulfato-ethylsulfonyl)-5-methylphenyl | 1-[2'-sulfo-1',4'-phenylene-4'-amino]-3-carboxypyrazol-5-on-4-yl | yellow |
| 21 | 2,5-dimethoxy-4-(β-sulfatoethylsulfonyl)-phenyl | 1-[2'-sulfo-1',4'-phenylene-4'-amino]-3-carboxypyrazol-5-on-4-yl | golden yellow |
| 22 | 4-N-[3'-(β-sulfatoethyl-sulfonyl)phenyl]amidocarbonylphenyl | 1-[2'-sulfo-1',4'-phenylene-4'-amino]-3-carboxypyrazol-5-on-4-yl | yellow |
| 23 | 1:1 copper complex of: 2-hydroxy-6-(β-sulfato-ethylsulfonyl)phenyl | 1-[2'-sulfo-1',4'-phenylene-4'-amino]-3-carboxypyrazol-5-on-4-yl | yellowish brown |
| 24 | 4-(β-sulfatoethyl-sulfonyl)phenyl | 1-[2'-sulfo-1',4'-phenylene-4'-amino]-3-methylpyrazol-5-on-4-yl | yellow |
| 25 | 2,5-dimethoxy-4-(β-sulfatoethylsulfonyl)- | 1-[2'-sulfo-1',4'-phenylene- | golden yellow |

| Ex. | Radical D— | Radical —K—N(R)— | Hue |
|---|---|---|---|
|  | phenyl | 4'-amino]-3-methylpyrazol-5-on-4-yl |  |
| 26 | 1:1 copper complex of: 2-hydroxy-5-(β-sulfato-ethylsulfonyl)phenyl | 1-[2'-sulfo-1',4'-phenylene-4'-amino]-3-methylpyrazol-5-on-4-yl | yellowish brown |
| 27 | 4-(β-sulfatoethyl-sulfonyl)phenyl | 4-hydroxy-2-sulfo-3,6-naphthylene-6-amino | orange |
| 28 | 3-(β-sulfatoethyl-sulfonyl)phenyl | 4-hydroxy-2-sulfo-3,6-naphthylene-6-amino | orange |
| 29 | 4-methoxy-3-(β-sulfato-ethylsulfonyl)phenyl | 4-hydroxy-2-sulfo-3,6-naphthylene-6-amino | red |
| 30 | 2-methoxy-5-(β-sulfato ethylsulfonyl)phenyl- | 4-hydroxy-2-sulfo-3,6-naphthylene-6-amino | red |
| 31 | 4-(β-sulfatoethyl-sulfonyl)phenyl | 4-hydroxy-2-sulfo-3,7-naphthylene-7-amino | orange |
| 32 | 6-(β-sulfatoethyl-sulfonyl)-1-sulfo-naphth-2-yl | 4-hydroxy-2-sulfo-3,7-naphthylene-7-amino | orange |
| 33 | 8-(β-sulfatoethyl-sulfonyl)-6-sulfo-naphth-2-yl | 4-hydroxy-2-sulfo-3,7-naphthylene-7-amino | orange |
| 34 | 4-methoxy-3-(β-sulfato-ethylsulfonyl)phenyl | 4-hydroxy-2-sulfo-3,7-naphthylene-7-amino | scarlet |
| 35 | 2-methoxy-5-(β-sulfato-ethylsulfonyl)phenyl | 4-hydroxy-2-sulfo-3,7-naphthylene-7-amino | scarlet |
| 36 | 2-sulfo-4-(β-sulfato-ethylsulfonyl)phenyl | 4-hydroxy-2-sulfo-3,7-naphthylene-7-amino | orange |
| 37 | 1:1 copper complex of: 2-hydroxy-5-(β-sulfato-ethylsulfonyl)phenyl | 4-hydroxy-2-sulfo-3,7-naphthylene-7-amino | ruby |
| 38 | 4-(β-sulfatoethyl-sulfonyl)phenyl | 4-hydroxy-2,8-disulfo-3,5-naphthylene-5-amino | yellowish red |
| 39 | 3-(β-sulfatoethyl-sulfonyl)phenyl | 4-hydroxy-2,7-disulfo-3,5-naphthylene-5-amino | red |
| 40 | 2-sulfo-4-(β-sulfato-ethylsulfonyl)phenyl | 4-hydroxy-2,7-disulfo-3,5-naphthylene-5-amino | yellowish red |
| 41 | 4-N-[3'-(β-sulfatoethyl-sulfonyl)phenyl]amido carbonylphenyl | 4-hydroxy-2,7-disulfo-3,5-naphthylene-5-amino | red |
| 42 | 2-methoxy-5-(β-sulfato-ethylsulfonyl)phenyl | 4-hydroxy-2,7-disulfo-3,5-naphthylene-5-amino | bluish red |
| 43 | 8-(β-sulfatoethylsul-fonyl)naphth-2-yl | 4-hydroxy-2,7-disulfo-3,5-naphthylene-5-amino | bluish red |
| 44 | 6-(β-sulfatoethylsul-fonyl)-1-sulfonaphth-2-yl | 4-hydroxy-2,7-disulfo-3,5-naphthylene-5-amino | bluish red |
| 45 | 8-(β-sulfatoethylsul-fonyl)-6-sulfonaphth-2-yl | 4-hydroxy-2,7-disulfo-3,5-naphthylene-5-amino | bluish red |
| 46 | 1:1 copper comlex of: 2-hydroxy-4-(β-sulfato-ethylsulfonyl)phenyl | 4-hydroxy-2,7-disulfo-3,5-naphthylene-5-amino | violet |
| 47 | 1:1 copper complex of: 2-hydroxy-4-(β-sulfato-ethylsulfonyl)-5-methoxy-phenyl | 4-hydroxy-2,7-disulfo-3,5-naphthylene-5-amino | blue |
| 48 | 1:1 copper complex of: 8-(β-sulfatoethylsul-fonyl)-6-sulfo-1-hydroxynaphth-2-yl | 4-hydroxy-2,7-disulfo-3,5-naphthylene-5-amino | blue |
| 49 | 1:1 copper complex of: 3-[2'-hydroxy-5'-(β-sulfatoethylsulfonyl)-phenylazo]-2-sulfo-4-hydroxynapht-7-yl [sic] | 4-hydroxy-2,7-disulfo-3,5-naphthylene-5-amino | dark blue |
| 50 | 3-sulfo-4-[3'-(β-sul-fatoethylsulfonyl)-phenylamino]phenyl | 4-hydroxy-2,7-disulfo-3,5-naphthylene-5-amino | blue |
| 51 | 3-sulfo-4-[2'-methoxy-5'-(β-sulfatoethyl-sulfonyl)phenylamino]-phenyl | 4-hydroxy-2,7-disulfo-3,5-naphthylene-5-amino | blue |
| 52 | 6-sulfo-4-[3'-(β-sul-fatoethylsulfonyl)-4'-methoxyphenylazo]-naphth-1-yl | 6-sulfo-1,2-naphthylene-1-amino | brown |
| 53 | 6-sulfo-4-[1'-sulfo-6'-(β-sulfatoethyl-sulfonyl)-naphth-2'-ylazo]-naphth-1-yl | 3-methyl-1,4-phenylene-1-amino | brown |
| 54 | 1:2 chromium complex of: 2-hydroxy-5-(β-sulfato-ethylsulfonyl)phenyl | 2,7-disulfo-4-hydroxy-3,5-naphthylene-5-amino | navy |
| 55 | 1:2 cobalt complex of: 2-hydroxy-5-(β-sulfato-ethylsulfonyl)phenyl | 2,7-disulfo-4-hydroxy-3,5-naphthylene-5-amino | violet |
| 56 | 1:2 chromium complex of: 2-carboxyphenyl | 2-sulfo-4-hydroxy-3,7-naphthylene-7-amino | reddish brown |

EXAMPLE 57

19 parts of cyanuric chloride are dispersed in 200 parts of ice water, and 18.8 parts of 1,3-diaminobenzene-4-sulfonic acid are added. The mixture is initially stirred at 0° to 5° C. and a pH of 2.5 for two hours and then at 0° to 5° C. and a pH of 4 for 30 minutes, and 4.25 parts of cyanamide are then added. The pH is brought to 10 by means of aqueous sodium hydroxide solution, the mixture is gradually heated to 50° to 60° C., stirred in this temperature range and at this pH for about 90 minutes, and then brought to a pH of 7 by means of hydrochloric acid. The 2-sulfo-5-(2'-chloro-4'-cyanamido-s-triazin-6-yl)aminoaniline compound thus obtained is diazotized directly in its synthesis solution in the usual manner by first adding 20 parts by volume of an aqueous 5N sodium nitrite solution and adding the mixture slowly to a mixture of 50 parts by volume of aqueous concentrated hydrochloric acid and 600 parts of ice. Stirring is continued for 2 hours, excess nitrous acid is destroyed, if necessary, by means of sulfamic acid, and the diazonium salt suspension obtained is then added to an aqueous solution of 36.2 parts of 1-[4'-(β-sulfatoethylsulfonyl)phenyl]-3-methyl-5-pyrazolone; the coupling reaction is carried out at 15° to 25° C. and a pH of 4.5 to 5.5, and the synthesis solution is then clarified at 40° to 50° C. by means of kieselguhr and filtration.

The azo compound according to the invention of the formula (written in the form of the free acid)

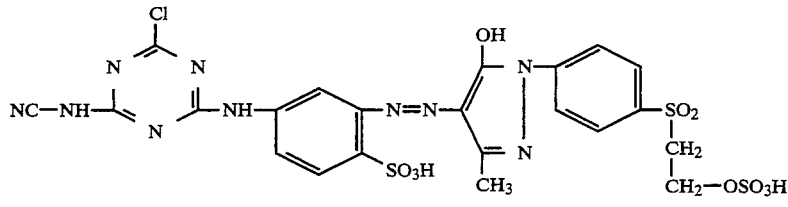

($\lambda_{max}$ = 398 nm)

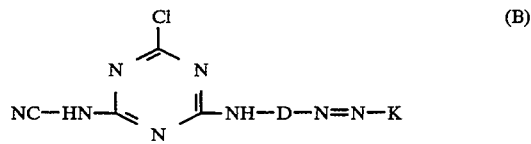

is isolated as its alkali metal salt (sodium salt) by spray-drying of the filtrate. It has very good fiber-reactive dye properties and dyes, for example, cotton in strong yellow shades which have good fastness properties, of which in particular the good daylight fastness and the good perspiration fastness can be mentioned.

EXAMPLE 58

In accordance with the procedure described in Example 57, 19 parts of cyanuric chloride are reacted with 18.8 parts of 1,3-diaminobenzene-4-sulfonic acid and then with 4.4 parts of cyanamide, this condensation product is diazotized, the diazonium salt suspension obtained added to an aqueous solution of 60 parts of 4-hydroxy-5-amino-6-[4'-(β-sulfatoethylsulfonyl)-phenylazo]naphthalene-2,7-disulfonic acid, and the coupling reaction is carried out at 15° to 25° C. and a pH of 4.5 to 5.5. The synthesis solution is clarified by means of kieselguhr and filtration, and the filtrate is evaporated to dryness under reduced pressure.

This gives a black electrolyte-containing powder of the alkali metal salt (sodium salt) of the azo compound according to the invention of the formula (written in the forth of the free acid)

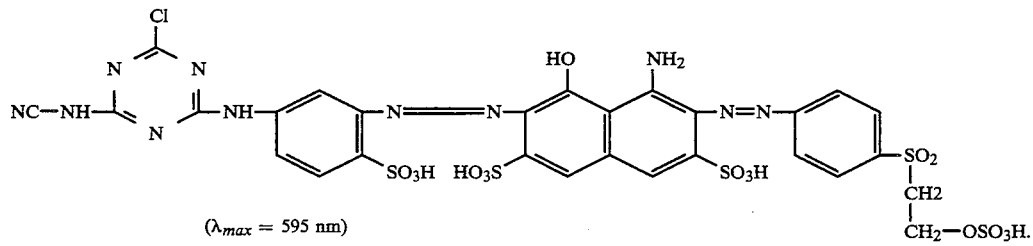

($\lambda_{max}$ = 595 nm)

The azo compound according to the invention has very good fiber-reactive dye properties and dyes the materials mentioned in the description, in particular cellulose fiber materials, such as cotton, by the application processes customary for fiber-reactive dyes in navy hues of high color strength.

EXAMPLES 59 TO 69

Further azo dyes according to the invention of the general formula (B) are described in the table examples below by means of the formula radicals of the general formula (B). They can be prepared according to the invention, for example analogously to the above exemplary embodiments 57 and using the starting components shown in the general formula (B) (for example the phenylenediamine of the formula $H_2N$—D—$NH_2$, the coupling component H—K, cyanuric chloride and cyanamide). They have very good fiber-reactive dye properties and dye the materials mentioned in the description, such as, in particular, cellulose fiber materials, for example cotton, by the application and fixation processes customary in the art for fiber reactive dyes, in the hues shown in the particular table example (in this case also cotton) which have high color strength and good fastness properties.

| Ex. | Radical —D— | Radical —K | Hue |
|---|---|---|---|
| 59 | ⟨phenyl-SO₃H⟩ | 1-[2'-sulfo-4'-(β-sulfatoethylsulfonyl)-phenyl]-3-methylpyrazol-5-on-4-yl | yellow |
| 60 | " | 1-[4'-(β-sulfatoethylsulfonyl)phenyl]-3-carboxypyrazol-5-on-4-yl | yellow |
| 61 | " | 1-[2'-sulfo-4'-(β-sulfatoethylsulfonyl)-phenyl]-3-carbomethoxy-5-on-4-yl | yellow |
| 62 | 4,6-disulfo-1,3-phenylene | 1-[4'-(β-sulfatoethylsulfonyl)-phenyl]-3-methyl-pyrazol-5-on-4-yl | yellow |
| 63 | 4,6-disulfo-1,3-phenylene | 1-[4'-(β-sulfatoethylsulfonyl)-phenyl]-3-carbomethoxypyrazol-5-on-4-yl | yellow |

-continued

| Ex. | Radical —D— | Radical —K | Hue |
|---|---|---|---|
| 64 | 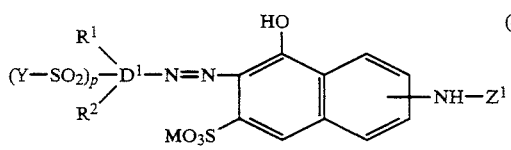 | 1-[4'-(β-sulfato-ethylsulfonyl)phenyl]-3-carboxypyrazol-5-on-4-yl | yellow |
| 65 | 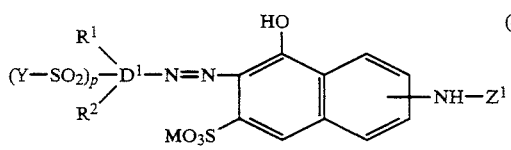 | 4-hydroxy-6-[N-methyl-N-(β-sulfato-ethylsulfonyl)amino]-2-sulfonaphth-3-yl | orange |
| 66 | " | 4-hydroxy-7-[N-methyl-N-(β-sulfato-ethylsulfonyl)amino]-2-sulfonaphth-3-yl | orange |
| 67 | " | 4-hydroxy-5-amino-6-[4'-(β-sulfatoethyl-sulfonyl)-phenylazo]-2,7-disulfonaphth-3-yl | navy |
| 68 | " | 4-hydroxy-5-amino-6-[2'-bromo-4'-(β-sulfatoethyl-sulfonyl)-phenylazo]-2,7-disulfonaphth-3-yl | navy |
| 69 | " | 4-hydroxy-5-amino-6-[2'-methoxy-5'-(β-sulfatoethylsul-fonyl)phenylazo]-2,7-disulfonaphth-3-yl | navy |

We claim:
1. A water-soluble azo dye of the general formula (4)

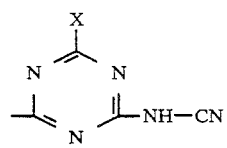 (4)

in which
Y is vinyl, β-sulfatoethyl, β-thiosulfatoethyl, β-phosphatoethyl, β-alkanoyloxyethyl of 2 to 5 carbon atoms in the alkanoyl radical, β-benzoyloxyethyl, β-(sulfobenzyoxyloxy)ethyl, β-(p-toluenesulfonyloxy)ethyl or β-halogenoethyl;
P is the number 1 or 2
M is hydrogen or an alkali metal,
R¹ is hydrogen, alkyl of 1 to 4 carbon atoms, alkoxy of 1 to 4 carbon atoms, halogen, trifluoromethyl, carboxyl or sulfo,
R² is hydrogen, alkyl of 1 to 4 carbon atoms, alkoxy of 1 to 4 carbon atoms, halogen or sulfo,
D¹ is a benzene or naphthalene ring and
Z¹ is a group of the general formula (3a)

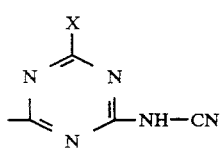 (3a)

in which X is chlorine, bromine, sulfo, alkoxysulfonyl of 1 to 4 carbon atoms or phenylsulfonyl.
2. A water-soluble azo dye of the general formula (9)

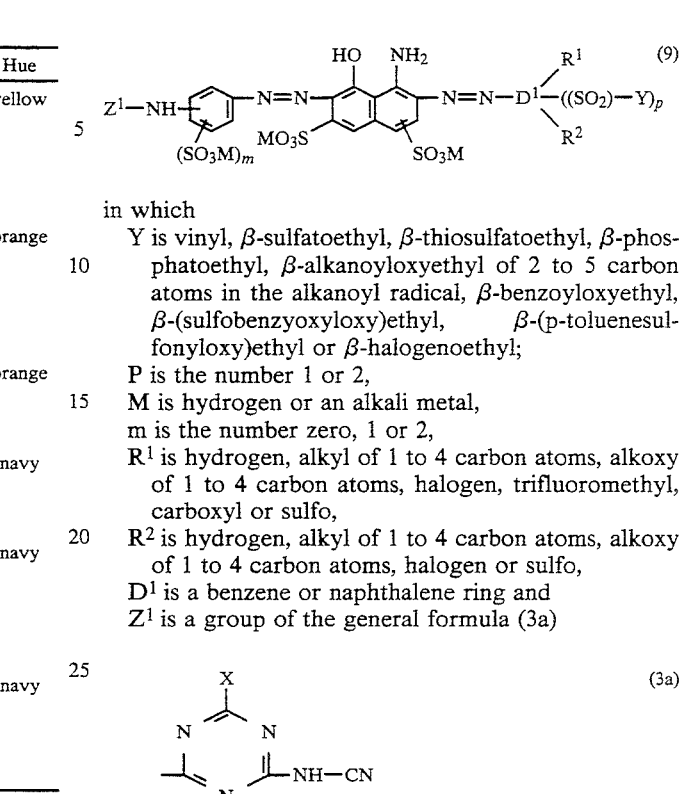 (9)

in which
Y is vinyl, β-sulfatoethyl, β-thiosulfatoethyl, β-phosphatoethyl, β-alkanoyloxyethyl of 2 to 5 carbon atoms in the alkanoyl radical, β-benzoyloxyethyl, β-(sulfobenzyoxyloxy)ethyl, β-(p-toluenesulfonyloxy)ethyl or β-halogenoethyl;
P is the number 1 or 2,
M is hydrogen or an alkali metal,
m is the number zero, 1 or 2,
R¹ is hydrogen, alkyl of 1 to 4 carbon atoms, alkoxy of 1 to 4 carbon atoms, halogen, trifluoromethyl, carboxyl or sulfo,
R² is hydrogen, alkyl of 1 to 4 carbon atoms, alkoxy of 1 to 4 carbon atoms, halogen or sulfo,
D¹ is a benzene or naphthalene ring and
Z¹ is a group of the general formula (3a)

(3a)

in which X is chlorine, bromine, sulfo, alkoxysulfonyl of 1 to 4 carbon atoms or phenylsulfonyl.
3. A water-soluble azo dye of the general formula (4a)

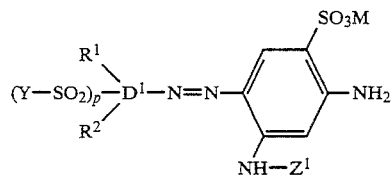 (4a)

in which
Y is vinyl, β-sulfatoethyl, β-thiosulfatoethyl, β-phosphatoethyl, β-alkanoyloxyethyl of 2 to 5 carbon atoms in the alkanoyl radical, β-benzoyloxyethyl, β-(sulfobenzyoxyloxy)ethyl, β-(p-toluenesulfonyloxy)ethyl or β-halogenoethyl;
P is the number 1 or 2
M is hydrogen or an alkali metal,
R¹ is hydrogen, alkyl of 1 to 4 carbon atoms, alkoxy of 1 to 4 carbon atoms, halogen, trifluoromethyl, carboxyl or sulfo,
R² is hydrogen, alkyl of 1 to 4 carbon atoms, alkoxy of 1 to 4 carbon atoms, halogen or sulfo,
D¹ is a benzene or naphthalene ring and
Z¹ is a group of the general formula (3a)

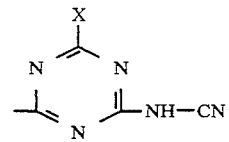 (3a)

in which X is chlorine, bromine, sulfo, alkoxysulfonyl of 1 to 4 carbon atoms or phenylsulfonyl.

4. A dye as claimed in claim 1 wherein X is chlorine.

5. A dye as claimed in claim 2, wherein X is chlorine.

6. A dye as claimed in claim 3, wherein X is chlorine.

7. A dye as claimed in claim 1, wherein Y is vinyl or β-sulfatoethyl.

8. A dye as claimed in claim 2, wherein Y is vinyl or β-sulfatoethyl.

9. A dye as claimed in claim 3, wherein Y is vinyl or β-sulfatoethyl.

10. A process for dyeing of hydroxyl- and or carboxamido-containing material in which a dye is applied to or incorporated in the material and fixed by means of heat and/or may means of an alkaline agent, wherein the dye used is a compound as claimed in one of claims 1, 2 and 3.

11. A process for dyeing a material containing hydroxy or carboxamide groups, comprising applying a dye as claimed in claim 1, to the material and fixing it by a means of heat or by a means of alkaline agent or by both.

12. A process for dyeing a material containing hydroxy or carboxamide groups, comprising applying a dye as claimed in claim 2, to the material and fixing it by a means of heat or by a means of alkaline agent or by both.

13. A process for dyeing a material containing hydroxy or carboxamide groups, comprising applying a dye as claimed in claim 3, to the material and fixing it by a means of heat or by a means of alkaline agent or by both.

14. The process as claimed in claim 11, wherein said material is a fiber material.

15. The process as claimed in claim 12, wherein said material is a fiber material.

16. The process as claimed in claim 13, wherein said material is a fiber material.

* * * * *

UNITED STATES PATENT AND TRADEMARK OFFICE
CERTIFICATE OF CORRECTION

PATENT NO. : 5,349,057
DATED : September 20, 1994
INVENTOR(S) : Holger M. Büch, et al.

It is certified that error appears in the above-indentified patent and that said Letters Patent is hereby corrected as shown below:

Claim 1, Col. 33, line 48 please replace "P" with -- p --.

Claim 2, Col. 34, line 14 please replace "P" with -- p --.

Claim 3, Col. 34, line 50 please replace "P" with -- p --.

Signed and Sealed this

Twenty-fourth Day of January, 1995

Attest:

BRUCE LEHMAN

Attesting Officer     Commissioner of Patents and Trademarks